(12) United States Patent
Cairns

(10) Patent No.: US 6,439,778 B1
(45) Date of Patent: Aug. 27, 2002

(54) OPTICAL FIBER CONNECTOR ASSEMBLY

(75) Inventor: James L. Cairns, Ormond Beach, FL (US)

(73) Assignee: Ocean Design, Inc., Ormond Beach, FL (US)

( * ) Notice: Subject to any disclaimer, the term of this patent is extended or adjusted under 35 U.S.C. 154(b) by 0 days.

(21) Appl. No.: 09/761,877

(22) Filed: Jan. 17, 2001

(51) Int. Cl.[7] ................................................. G02B 6/38
(52) U.S. Cl. ........................................ 385/60; 385/55
(58) Field of Search ............................. 385/56, 58, 59, 385/60

(56) References Cited

U.S. PATENT DOCUMENTS

| | | | |
|---|---|---|---|
| 4,142,776 A | | 3/1979 | Cherin ........................ 385/71 |
| 4,753,510 A | * | 6/1988 | Sezerman ..................... 385/61 |
| 4,807,957 A | * | 2/1989 | de Jong et al. ............... 385/64 |
| 5,738,535 A | | 4/1998 | Cairns ........................ 439/138 |
| 5,898,807 A | * | 4/1999 | Welsh ........................ 385/56 |
| 5,937,123 A | * | 8/1999 | Frelier ....................... 385/79 |

OTHER PUBLICATIONS

Molex MTP Ribbon Connector Data Sheet, No date.

* cited by examiner

*Primary Examiner*—Tulsidas Patel
(74) *Attorney, Agent, or Firm*—Brown, Martin, Haller & McClain, LLP

(57) ABSTRACT

An optical fiber connector assembly has releasably mating first and second units each having a through bore and a respective ferrule mounted in the through bore and having a front end face having a plurality of optical contacts for mating, face-to-face engagement with corresponding contacts in the front end face of the other ferrule. At least one of the ferrules is movably mounted in the through bore for movement between an advanced and retracted position. A ribbon fiber extends through each through bore and the individual fibers in the ribbon fiber extend through the respective ferrule and are terminated at respective contacts in the end face. A biasing device is mounted in the through bore of at least one unit behind the movable ferrule and bears against the rear end of the ferrule to bias it towards its advanced position. The biasing device includes a spring spaced rearwardly from the rear end of the ferrule by a spacer assembly having a flat forward end face bearing against the flat rear end of the ferrule.

9 Claims, 3 Drawing Sheets

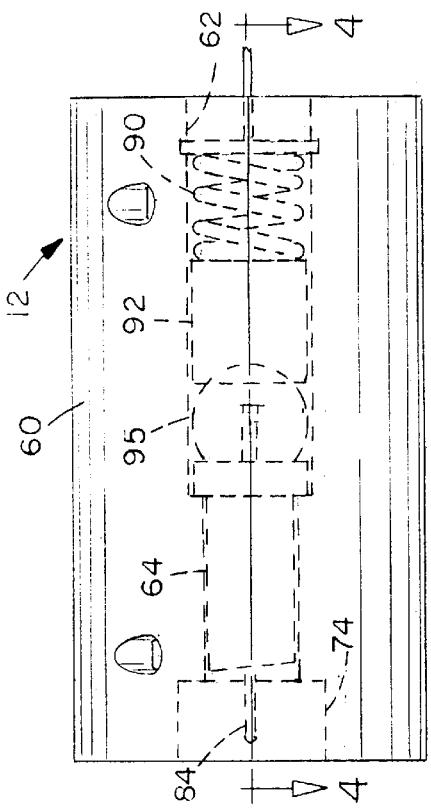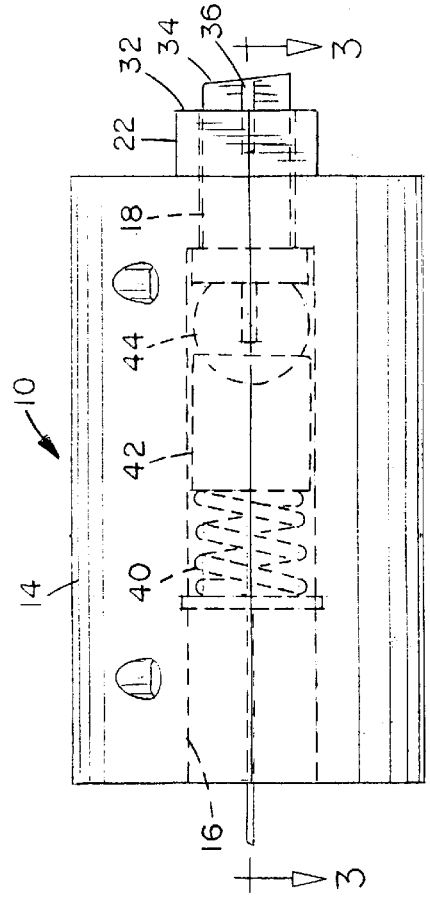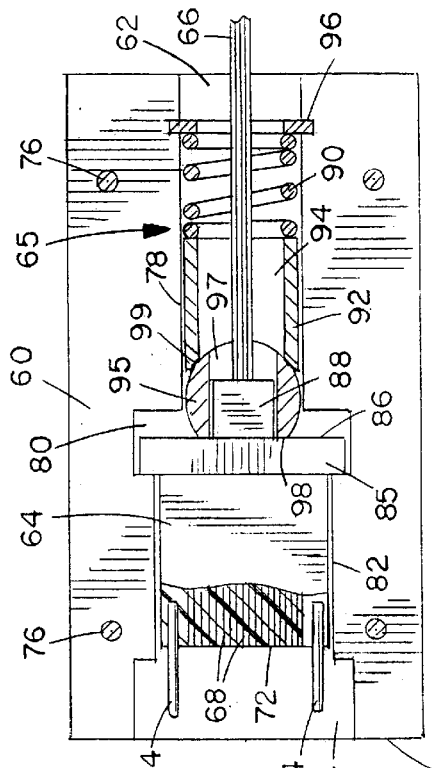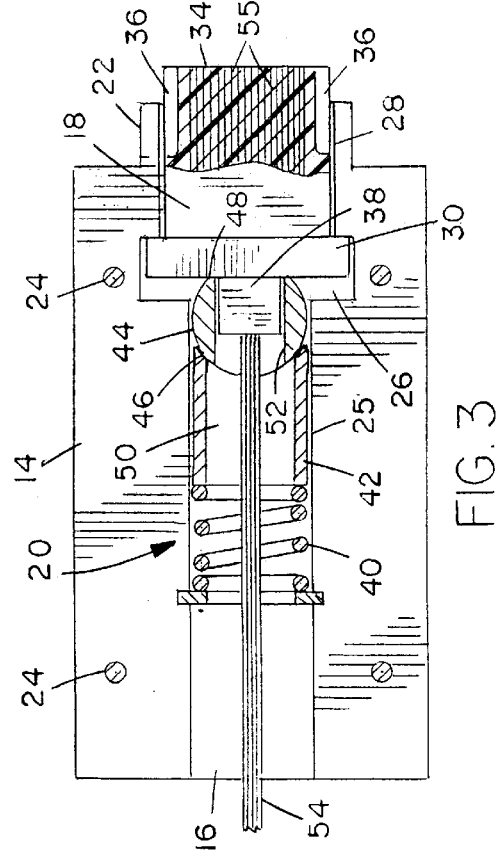
FIG. 1
FIG. 2
FIG. 3
FIG. 4

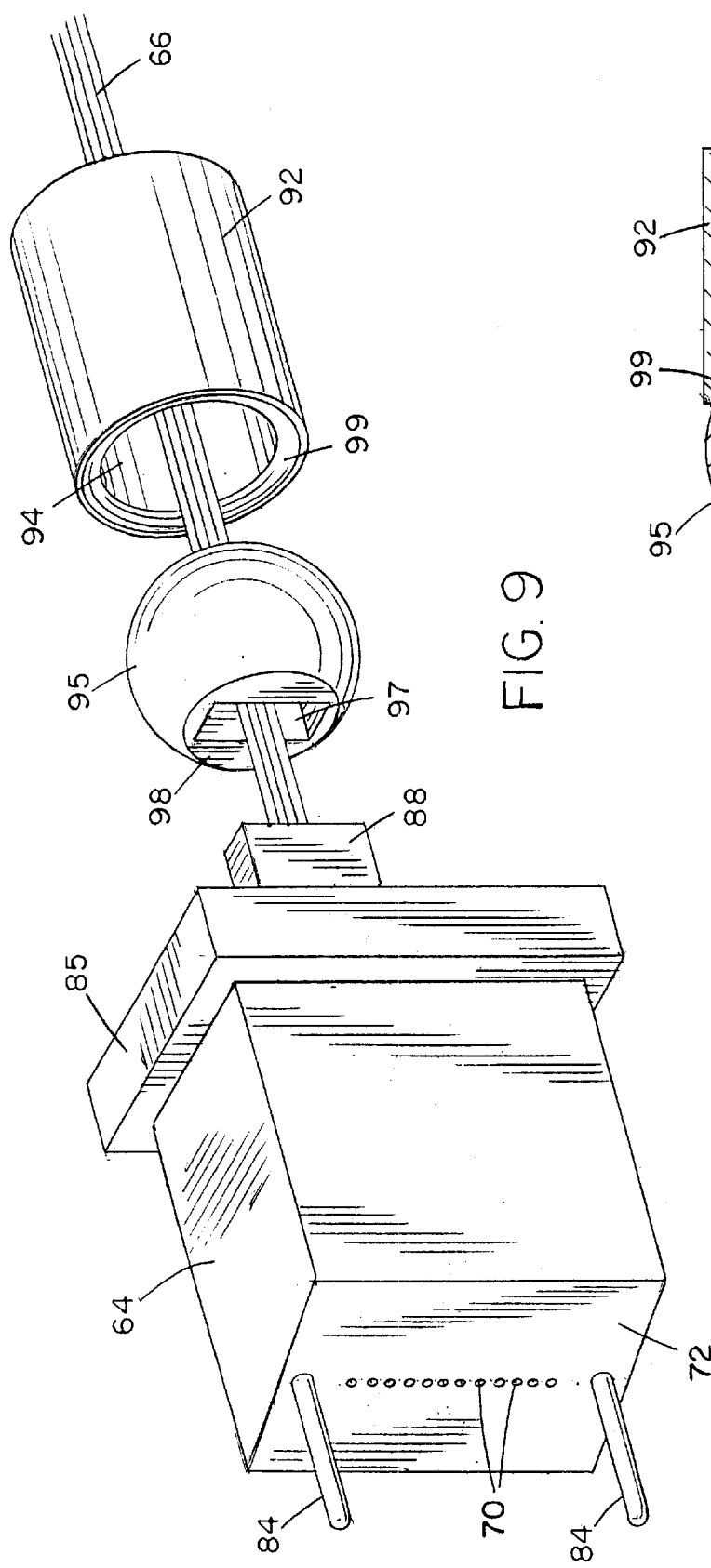
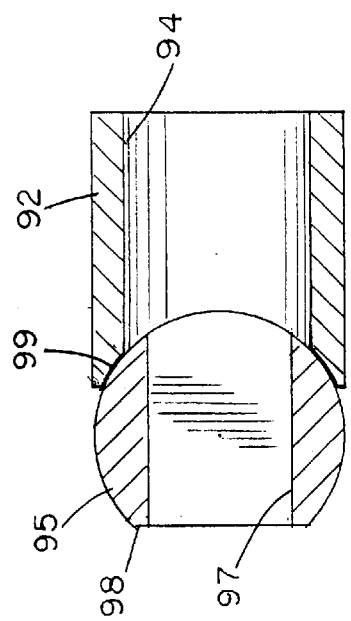
FIG. 9
FIG. 10

OPTICAL FIBER CONNECTOR ASSEMBLY

BACKGROUND OF THE INVENTION

The present invention relates generally to optical fiber connectors of the type used to connect multiple optical fibers or ribbon fibers.

Optical fiber connectors are known in which each half of the connector comprises a ferrule in which a plurality of optical fibers are terminated. The ferrule is mounted in a housing with a small amount of free play, and is biased by a spring into a forward position in the housing. The outer end face of the ferrule is exposed for face to face contact with the ferrule end face in the mating opposite half of the connector. Each fiber is terminated at a respective contact face at the outer end of the respective ferrule, and the optical contact faces engage one another to provide optical communication between the connector halves when mated together. The arrangement is such that the ferrules will be moved back slightly when the connection is made, compressing the biasing springs and ensuring a good optical contact between the fiber end faces. This type of optical fiber connector can connect a ribbon fiber containing up to 48 fibers.

One problem with known connectors for connecting a plurality of optical fibers is potential misalignment, side loading and torque in the connection. One reason for this is that the spring end acting on the inner end face of the ferrule does not present a flat surface, and thus may tend to apply some side loading or torque to the ferrule.

SUMMARY OF THE INVENTION

It is an object of the present invention to provide a new and improved optical fiber connector assembly.

According to the present invention, an optical fiber connector assembly is provided, which comprises a first unit having a first housing with a through bore and a first ferrule movably mounted in the through bore for movement between an advanced and retracted position, the ferrule having a forward end face, a second unit for releasable mating engagement with the first unit, the second unit having a housing with a through bore and a second ferrule mounted in the through bore having a forward end face for face to face engagement with the forward end face of the first ferrule when the units are mated together, each ferrule having a plurality of optical contacts at its end face for optical contact with the contacts in the end face of the opposing ferrule when the units are connected together, the arrangement being such that the ferrules are pushed back into a retracted position when the units are mated together, the first ferrule having a rear end face, and a biasing device mounted in the through bore behind the first ferrule and bearing against the rear end face of the ferrule to bias it towards its forward position, the biasing device comprising a spring having a rear fixed end and a forward end, a bushing having a front end and a rear end, the forward end of the spring bearing against the rear end of the bushing, the front end of the bushing having a part spherical seat, and a ball member rotatably seated in the seat at the forward end of the bushing, the ball member having a flat face bearing against the rear face of the ferrule.

This arrangement provides a biasing force in a direction perpendicular to the end face of the ferrule, reducing the risk of misalignment between the optical contacts, and avoiding torque or twisting forces which may result in improper alignment. The flat face of the ball member will be in full face to face contact with the flat rear end face of the ferrule at all times. The ball and socket type engagement between the bushing and ball member will compensate for any non-perpendicular force applied by the end of the spring on the bushing. The assembly will act in the manner of a universal joint to allow better alignment between the optical contacts.

In an exemplary embodiment of the invention, the connector assembly is an optical fiber assembly, and a plurality of optical fibers extend through the respective ferrule and have end faces terminated at the respective ferrule end face. Preferably, the second ferrule is also slidably mounted in the second housing for movement between advanced and retracted positions, and spring biased towards the advanced or forward position by a biasing device identical to that in the first housing. The amount of movement provided on each side of the connector is very small, preferably of the order of fifty thousandths of an inch, and the movement together with the spring loading of the ferrules ensures good face to face contact between the optical contacts.

To improve optical performance, the mating end faces of the two ferrules may in some cases each be angled slightly. One of the end faces has a pair of alignment pins projecting outwardly, while the other end face has alignment holes for receiving the pins as the units are mated together, to ensure proper alignment of the optical contacts. It is these pins that cause the fined mechanical alignment of the ferrules. But even with the pins, which have some small clearance with the bores, mis-alignment of the ferrules can occur if there is axial or rotational mis-alignment, or axial tilting between the ferrules. The universal joint like connection at the ball member allows compensation for any such mis-alignments with the ball member swiveling to allow proper alignment of the pins in the alignment holes. This ensures that the optical contacts are properly aligned.

In an exemplary embodiment of the invention, each bushing and ball member has a through bore and each ferrule has a rearwardly projecting tail portion which engages in the through bore for locating purposes. A plurality of optical fibers extend into each housing through bore, through the bushing and ball member through bores, and through the ferrule, with each fiber being terminated in a respective optical contact at the mating end face of the respective ferrule.

The optical fiber connector assembly of this invention reduces the risk of misalignment or torque on the fibers which could result in previous ribbon fiber connectors where the non-flat end face of the biasing spring bore directly against a flat end face of the ferrule. In this invention, a flat end face of an otherwise spherical ball member bears against the flat rear end face of the respective ferrule, and the ball member engages in a radiused seat at one end of bushing which is biased by the spring. This provides a universal joint type of connection, allowing much better alignment of the ferrule end faces and helping to ensure that the spring applies an axial biasing force to the ferrule.

BRIEF DESCRIPTION OF THE DRAWINGS

The present invention will be better understood from the following detailed description of an exemplary embodiment of the invention, taken in conjunction with the accompanying drawings in which like reference numerals refer to like parts and in which:

FIG. 1 is a side view of the plug portion of the optical connector according;

FIG. 2 is a side view of the receptacle portion of the connector;

FIG. 3 is a sectional view taken on line 3—3 of FIG. 1;

FIG. 4 is a sectional view taken on line 4—4 of FIG. 2;

FIG. 9 is a perspective view of the separated internal components of the receptacle unit; and FIG. 10 is a sectional view of the ball and socket elements.

DETAILED DESCRIPTION OF THE DRAWINGS

Figure 5:
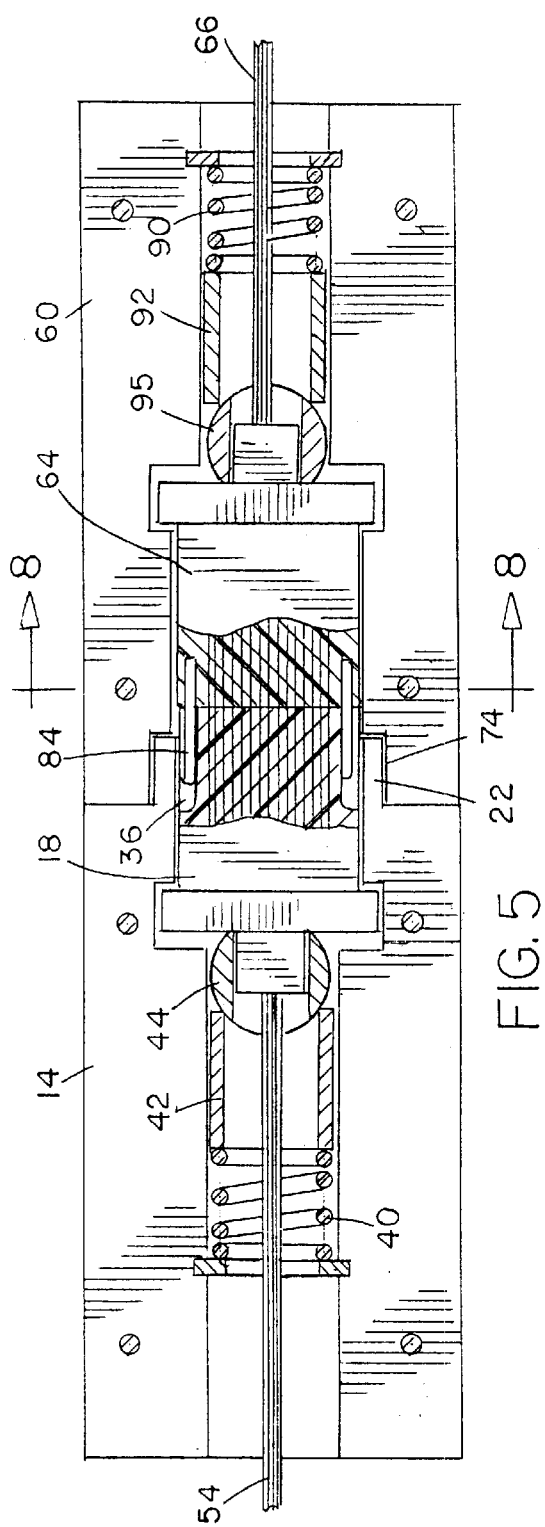
FIG. 5 is a sectional view of the two portions connected.

The drawings illustrate an optical connector assembly according to an exemplary embodiment of the present invention which is suitable for connection of two lengths of fiber ribbon which may contain up to 48 or more individual optical fibers. The assembly basically comprises a first or plug unit 10 as illustrated in FIGS. 1 and 3, and a second, receptacle unit 12 as illustrated in FIGS. 2, 4, 9 and 10, which is designed for releasable mating engagement with the plug unit, as indicated in FIG. 5.

Figure 6:
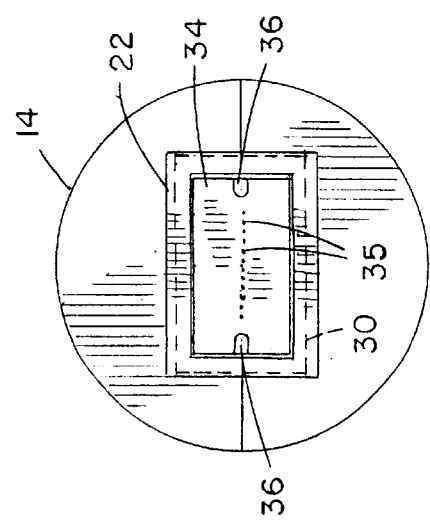
FIG. 6 is a right hand end view of the plug portion in FIG. 1.

As illustrated in FIGS. 1 and 3, the plug unit 10 basically comprises an outer housing 14 of hard plastic or the like having a through bore 16 of varying shape and dimensions, and a ferrule 18 of ceramic or similar material slidably mounted in a front end portion of the housing 14 and biased outwardly by a biasing assembly 20 mounted in bore 16 to the rear of ferrule 18. As illustrated in FIGS. 1 and 6, the housing is of generally cylindrical shape with a rectangular projection 22 from its forward end face, and may be made in two semicylindrical halves which are secured together by screws 24 extending through aligned through bores in the two halves of the housing, for ease of assembly. The through bore has a first end portion 25 extending from the rear of the housing which is of generally cylindrical shape, an enlarged portion 26 of rectangular cross section at the inner end of bore portion 25, and a rectangular portion 28 of reduced dimensions extending forwardly from enlarged portion 26 to the outer end of rectangular projection 22.

The optical ferrule 18 is a solid member of shape and dimensions designed for sliding engagement in the rectangular bore portions 26,28. Ferrule 18 may be of ceramic, metal, or hard plastic material, and has an enlarged end portion 30 which engages in bore portion 26 and a rectangular portion of reduced dimensions which extends forwardly from portion 30 through bore portion 28 and projects forwardly from the forward end 32 of housing 14. The front end face 34 of ferrule 18 is slightly angled in one direction, as indicated in FIG. 1, and has a plurality of spaced optical contacts 35 extending in a line, some of which are illustrated in FIG. 6. The optical contacts may be provided over substantially the entire outer end face if necessary, depending on the number of optical fibers to be connected. A pair of alignment holes or slots 36 are provided adjacent opposite side edges of the end face 34, as indicated in FIGS. 1, 3 and 6. A rectangular tail or locating portion 38 of reduced dimensions projects rearwardly from the inner end of the enlarged end portion 30 of the ferrule.

The biasing assembly 20 is in three parts, comprising a biasing spring 40, a cylindrical bushing 42, and a ball member 44, all mounted in the cylindrical bore portion 25. The spring 40 acts between an annular stop member 45 and a rear end of bushing 42. The ball member 44 is of substantially spherical shape and engages in a part spherical or radiused seat 46 at the forward end of bushing 42. Member 44 has a flat front end face 48 which bears against the rear end face of the enlarged portion 30 of the ferrule. Bushing 42 has a through bore 50, and the ball member 44 has an aligned, elongate or generally rectangular through bore 52 for sliding engagement over the locating or tail end portion 38 of the ferrule 18. A first ribbon fiber 54 extends into the rear end of the through bore 16, through the spring 40 and bushing 42, and into the bore 52 in the ball member. The outer casing of the ribbon fiber is stripped back to enable individual fibers 55 in the ribbon fiber to extend through appropriate epoxy filled grooves or bores in the ferrule up to the front end face 34 in a conventional manner, and the outer end of each fiber is machined to form a respective optical contact 35 at the ferrule end face.

The spring 40 biases the bushing 42 and ball member 44 outwardly so that the flat end face 48 of the ball member acts against the flat rear end face of the ferrule 18 in order to bias the ferrule outwardly into the extended position illustrated in FIGS. 1 and 3. The flat, face-to-face engagement between ball member 44 and ferrule 18 will help to compensate for any non-planar engagement between the end of spring 44 and the bushing 42, ensuring that the biasing force is applied in a direction transverse to the end face of the ferrule, helping to avoid any misalignment or torque between the ferrules as they are mated together.

The receptacle unit 12 also comprises an outer housing 60 having a through bore 62 in which a ferrule 64 of ceramic or similar material is slidably mounted and biased into an extended position by a biasing assembly 65. The ferrule 64 and biasing assembly 65 are illustrated in more detail in FIGS. 9 and 10, and it will be understood that the ferrule 18 and biasing assembly 20 of the plug unit are of identical structure to that illustrated in FIGS. 9 and 10. A second optical fiber ribbon 66 carrying multiple optical fibers extends through the bore 62 up to the ferrule 64, and the individual, stripped fibers 68 extend from the end of ribbon 66 through grooves or bores in the ferrule 64, and are terminated to form respective optical contacts 70 in the front end face 72 of the ferrule.

Figure 8:
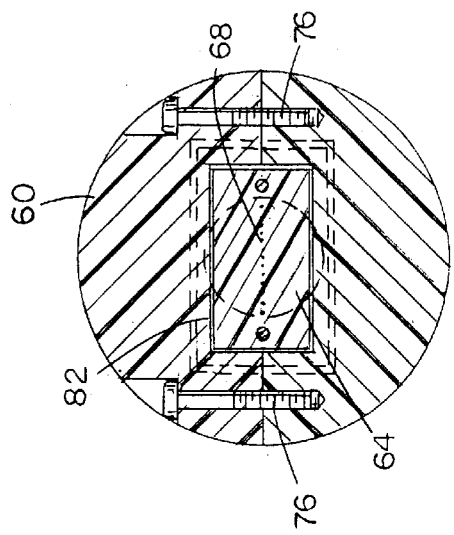
FIG. 8 is a sectional view taken on line 8—8 of FIG. 5.

The housing 60 is of generally cylindrical shape with an indent or recess 74 of rectangular cross-section at its forward end 75 shaped and dimensioned for receiving the projecting forward end portion 22 of the plug housing 14. Housing 60 is also made in two semicylindrical halves secured together by screws 76 or the like, as best illustrated in FIG. 8. As in the plug unit, the through bore has a rear, cylindrical portion 78 receiving the biasing assembly 65, an enlarged portion 80 of rectangular cross-section, and a rectangular portion 82 of smaller dimensions extending up to the indent or enlarged counter-bore 74.

Figure 7:
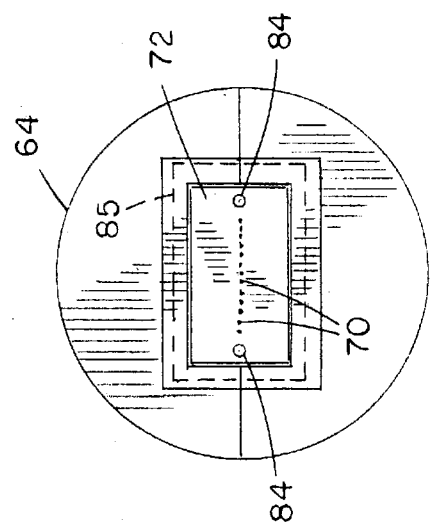
FIG. 7 is a left hand end view of the receptacle portion of FIG. 2.

The optical ferrule 64 in the receptacle unit is of similar shape and dimensions to ferrule 18, and is designed for close sliding engagement in the rectangular bore portions 80 and 82, as best illustrated in FIG. 4. Unlike ferrule 18, the ferrule 64 does not extend outwardly from the end face 75 of the receptacle housing, but the front end face 72 is recessed inwardly from indent or recess 74 in the extended position of FIG. 4. As best illustrated in FIG. 9, ferrule 64 has an enlarged end portion 85 of rectangular shape which engages in the enlarged bore portion 80 and has a flat rear end face 86 engaged by biasing assembly 65, as discussed in more detail below. A rectangular portion of reduced dimensions extends forwardly from portion 80 into the smaller bore bortion 82. The front end face 72 is slightly angled at a taper matching that of the end face 34 of the mating ferrule, as indicated in FIGS. 1 and 2. The optical contacts 70 are suitably arranged in a line as indicated in FIGS. 7 and 9. It will be understood that only a few of the optical contacts are illustrated in FIGS. 7 and 9, and that in practice up to 48 or more such contacts may be provided, depending on the number of optical fibers to be connected.

A pair of locating pins 84 extend outwardly from end face 72 for engagement in the alignment slots or holes 36 in the mating ferrule 18. A rectangular tail or locating portion 88 extends from rear end face 86 of the ferrule for engagement in the biasing assembly.

The biasing assembly 65 is identical to that of the plug unit, and comprises a biasing spring 90, a cylindrical bushing 92 having a through bore 94, and a ball member 95 located between the bushing 92 and the rear end face 86 of the ferrule. The bushing and ball member are illustrated in more detail in FIGS. 9 and 10. Biasing spring 90 acts between an annular seat 96 and the rear end of bushing 92. As best illustrated in FIG. 9, ball member 95 is part spherical in shape, and has a rectangular through bore 97 in which tail or locating portion 88 of the ferrule 64 is engaged, and a flat end face 98 which bears against the rear end face 86 of the ferrule. The ball member seats against a radiused seat 99 at the forward end of bushing 92, as illustrated in FIG. 10. The ribbon fiber 66 extends through the spring 90, the bore in bushing 92, and the through bore in ball member 95 up to ferrule 64, as in the plug unit.

When the plug and receptacle units are separate as in FIGS. 3 and 4, the two ferrules are biased outwardly by the respective biasing assemblies into the extended position illustrated in the drawings. As the two units are brought together, the projecting outer end portion 36 of the ferrule 18 will first enter the indent 74, followed by the projecting end portion 22 of the housing which helps to position the ferrule 18 in the correct orientation relative to ferrule 64. The alignment pins 84 of ferrule 64 will then enter the slots or holes 36, ensuring that the optical contacts 35 and 70 are properly aligned. As the parts are brought into full engagement, the optical contact ends of the fibers will be brought into face-to-face engagement, and each ferrule will be pushed slightly rearwardly against the action of biasing spring 40 and 90, respectively. This helps to ensure proper optical engagement between the optical contacts. Each ferrule is designed to be moved rearwardly through a distance of around 50 microns as the units are fully mated together between the extended positions of FIGS. 3 and 4 and the retracted, mated positions of FIG. 5.

Unlike a conventional ribbon fiber connector, where a biasing spring acts directly against the rear end face of each ferrule, the biasing assemblies of this invention move the biasing spring rearwardly away from direct contact with the ferrule, and provide a flat end face bearing against the flat rear face of the ferrule. The engagement of the tail portion of each ferrule in the respective bore in the adjacent ball member ensures that these parts remain in co-axial alignment and the flat end face of the ball member engages flat or face-to-face with the respective ferrule end face. Any offset in the force applied by the biasing spring will be accommodated by the universal joint connection between the ball member and radiused seat in the bushing. This reduces the problem of misalignment and torque at the optical junction as a result of non-axial biasing forces on the two ferrules, due to the non-flat end face of a spring acting directly against the ferrule as was characteristic of prior art ribbon fiber connectors. Instead, with this arrangement, the two ball members rotatably seated in the radiused seats at the end of respective elongate bushings will allow better alignment of the spring force with the axis of the ferrule, ensuing that the biasing force is applied in a direction perpendicular to the ferrule end face.

Although an exemplary embodiment of the invention has been described above by way of example only, it will be understood by those skilled in the field that modifications may be made to the disclosed embodiment without departing from the scope of the invention, which is defined by the appended claims.

I claim:

1. An optical fiber connector assembly, comprising:

a first unit having a first housing with a through bore and a first ferrule movably mounted in the through bore for movement between an advanced and retracted position, the ferrule having a forward end face and a rear end face;

a second unit for releasable mating engagement with the first unit, the second unit having a housing with a through bore and a second ferrule mounted in the through bore and having a forward end face for face to face engagement with the forward end face of the first ferrule when the units are mated together;

the forward end face of each ferrule having a plurality of contacts for engagement with corresponding contacts in the end face of the other ferrule when the units are mated; and a biasing device mounted in the through bore in the first unit behind the first ferrule and bearing against the rear end face of the ferrule to bias it towards its advanced position, the biasing device comprising a spring having a rear fixed end and a forward end, a bushing having a front end and a rear end, the forward end of the spring bearing against the rear end of the bushing, the front end of the bushing having a seat, and a ball member rotatably seated in the seat at the forward end of the bushing, the ball member having a flat face bearing against the rear face of the ferrule.

2. The connector assembly as claimed in claim 1, wherein the second ferrule is movably mounted in the through bore in the second unit for movement between an advanced position and a retracted position, and a second biasing device is mounted in the through bore in the second unit to bias the second ferrule into the advanced position, whereby both ferrules are moved into the respective retracted position on mating of the first and second units with the ferrule end faces in face to face engagement, and are biased into the advanced positions on separation of the units.

3. The assembly as claimed in claim 2, wherein the second biasing device comprises a second spring having a rear fixed end and a forward end, a second bushing having a front end and a rear end, the forward end of the second spring bearing against the rear end of the second bushing, the front end of the second bushing having a seat, and a second ball member rotatably seated in the seat at the forward end of the bushing, the ball member having a flat face bearing against the rear face of the ferrule.

4. The assembly as claimed in claim 1, wherein the ball member has an indent and a locating tail projects from the rear end face of the ferrule into the indent for axial alignment of the ball member and bushing, whereby the ferrule rear end face and ball member flat face are held in face-to-face engagement.

5. The assembly as claimed in claim 1, including a first optical fiber ribbon containing a plurality of optical fibers extending into the through bore of the first unit, and a second optical fiber ribbon containing a corresponding number of optical fibers extending into the through bore of the second unit, the fibers of each ribbon extending through the respective ferrule and terminating in the respective optical contacts of the respective ferrule end faces.

6. The assembly as claimed in claim 1, wherein the bushing comprises an elongate member having a through bore.

7. The assembly as claimed in claim 6, wherein the bushing seat is radiused at a curvature matching that of the ball member for rotatable engagement with the ball member.

8. The assembly as claimed in claim 1, wherein the mating end face of each ferrule is angled at a taper matching that of the end face of the other ferrule.

9. An optical fiber connector assembly, comprising:

- a first unit having a first housing with a through bore and a first ferrule movably mounted in the through bore for movement between an advanced and retracted position, the ferrule having a forward end face having a plurality of optical contacts and a rear end;
- a first group of optical fibers extending through the through bore and first ferrule and terminated at the respective optical contacts;
- a second unit for releasable mating engagement with the first unit, the second unit having a housing with a through bore and a second ferrule mounted in the through bore and having a forward end face for face to face engagement with the forward end face of the first ferrule when the units are mated together, the forward end face having a plurality of optical contacts for optical contact with respective contacts in the first ferrule end face when the units are mated together;
- a second group of optical fibers extending through the through bore in the second unit and through the second ferrule, each fiber of the second group being terminated at a respective one of the optical contacts;
- a biasing device mounted in the through bore of the first unit behind the ferrule and bearing against the rear end face of the ferrule to bias it towards its advanced position, the biasing device comprising a spring having a rear fixed end and a forward end spaced from the rear end of the ferrule, and a spacer between the forward end of the spring and the rear end of the ferrule, the spacer having a flat forward end face for face-to-face engagement with the rear end of the ferrule; and
- the spacer comprising an elongate bushing having a rear end engaging the forward end of the spring and a forward end comprising a seat, and a ball member mounted in the through bore between the bushing seat and the ferrule rear end, the ball member having a spherical face engaging the bushing seat and a flat forward face comprising said forward end face.

* * * * *